March 15, 1938.    R. T. WINDLE    2,111,443
ANCHOR
Filed March 8, 1937
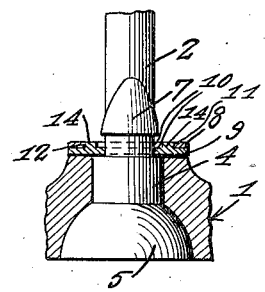
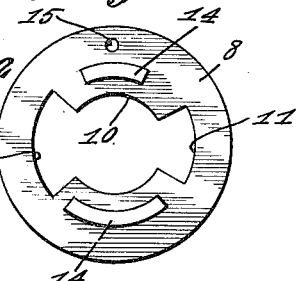
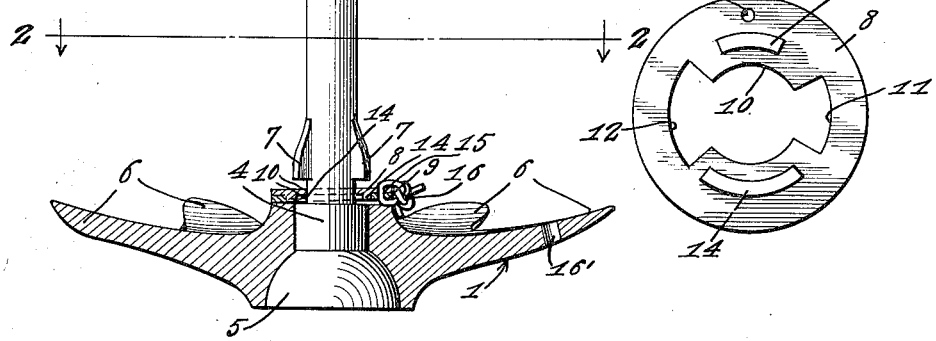
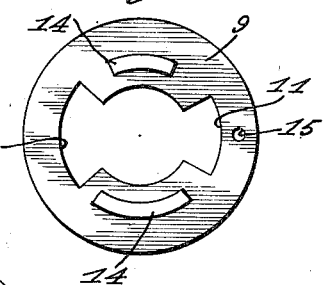
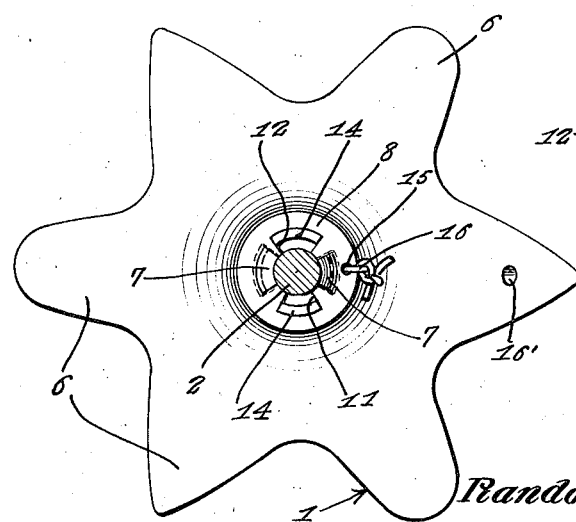
Randolph T. Windle, INVENTOR
BY Victor J. Evans & Co.
ATTORNEYS Patented Mar. 15, 1938

2,111,443

UNITED STATES PATENT OFFICE 2,111,443

ANCHOR

Randolph T. Windle, New York, N. Y.

Application March 8, 1937, Serial No. 129,715

1 Claim. (Cl. 114—206)

This invention relates to anchors of the type set forth in my United States Patent No. 1,356,481 and has for the primary object the provision of an improved connection between the head and shank of the anchor to afford or provide the desired swivel between said parts and permit the latter to be readily disconnected without tools when desired and eliminate danger of them becoming accidentally disconnected during the use of the anchor.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating an anchor constructed in accordance with my invention.

Figure 2 is a sectional view taken on the line 2—2 of Figure 1.

Figure 3 is a fragmentary vertical sectional view showing means of locking the shank to the head.

Figure 4 is a plan view illustrating one of the locking plates.

Figure 5 is a plan view illustrating another locking plate.

Referring in detail to the drawing, the numeral 1 indicates the head of the anchor, 2 the shank having at one end an eye 3 to which the anchor cable or rope is attached. The other end of the shank is enlarged to provide a cylindrical portion 4 and a semi-spherical shaped portion 5. The portions 4 and 5 merge with each other.

The head is of convexo concave shape and provided with a number of star-shaped points 6 which constitute the flukes. The head 1 is centrally apertured and the aperture is of a shape to match the cylindrical portion 4 and the semi-spherical shaped portion 5 of the shank 2. The portions 4 and 5 of the shank fitting in the opening of the head prevent the shank from pulling through the opening of the head in one direction. However, the shank 2 may pass freely through the opening of the head when moved in an opposite direction. The shape of the opening and the portions 4 and 5 present a swivel connection between the head and the shank so that the shank can rotate freely in the head during the use of the anchor to prevent the anchor rope or chain from winding or twisting caused by the movement of the boat by wind and tides.

Formed on the shank 2 adjacent the cylindrical portion 4 are opposed tapered lugs 7 capable of passing through the opening in the head when the shank is slid relative to the head with the head moving in the direction of the eye 3. When the cylindrical portion 4 and portion 5 are seated in the opening of the head 1 the lugs are spaced from the head and arranged on the shank between the lugs and the cylindrical portion 4 are discs 8 and 9 each having a centrally located opening 10 of a diameter slightly larger than the diameter of the shank so that said plate will slide on the shank. Slots 11 and 12 are formed in each of the plates 8 and 9 and communicate with the openings 10 of said plate. The slots 11 and 12 are of a size to permit the lugs to pass freely therethrough when aligned with said lugs. However, when the slots 11 and 12 of one of the plates is out of alignment with the slots 11 and 12 of the other plate the lugs will be prevented from moving through said slots 11 and 12, consequently preventing the removal of the shank 2 from the head 1. Lugs 14 are formed on the plates 8 and 9 and the lugs of each plate may enter the slots 11 and 12 of the other plate to prevent relative rotation of said plates. The plates 8 and 9 have apertures 15 adapted to align when the lugs 14 of the plates 8 and 9 extend through the slots 11 and 12 to receive a tie element 16. The tie element 16 prevents the plates from separating keeping the lugs 14 in the slots to prevent relative rotation of the plates and consequently preventing the aligning of the slots 11 and 12 of said plates 8 and 9. As long as the slots 11 and 12 of said plates 8 and 9 cannot be aligned, the lugs 7 cannot pass through the opening of the head 1.

To take apart the shank and the head the tie element 16 is removed and the plates 8 and 9 separated from one another and then rotated to align the slots 11 and 12 thereof. The shank then is moved endwise with respect to the head with the lugs 7 passing through the aligned slots 11 and 12 of said plates and also through the opening of the head. The shank and head when separated can be stored in a comparatively small space.

One of the flukes has an opening 16' for receiving the cable so that the anchor will be inverted and thus more easily raised by means of a trip line.

What is claimed is:

An anchor comprising a fluked head formed with a socket, a shank having a socket member rotatably mounted within said socket, said socket member fashioned with an enlarged section for preventing withdrawal of said shank from said head in one direction and permitting withdrawal of said shank from said head through said socket in an opposite direction, means controlling the withdrawal of said shank from said head in said opposite direction and comprising stop elements carried by said shank, a pair of plates rotatably mounted on said shank between said head and said elements and fashioned with slots adapted for registry whereby to permit said shank including said elements to be withdrawn through said plates, socket and head, and lugs on said plates seatable within said slots for preventing registry of said slots and withdrawal of said shank and elements through said plates and head, and means for locking said plates together to maintain said lugs in said slots.

RANDOLPH T. WINDLE.